(12) United States Patent
Walker

(10) Patent No.: US 11,535,161 B1
(45) Date of Patent: Dec. 27, 2022

(54) DEPLOYABLE STEPS FOR A TAILGATE

(71) Applicant: Ernest Walker, Richmond, VA (US)

(72) Inventor: Ernest Walker, Richmond, VA (US)

(*) Notice: Subject to any disclaimer, the term of this patent is extended or adjusted under 35 U.S.C. 154(b) by 197 days.

(21) Appl. No.: 17/074,703

(22) Filed: Oct. 20, 2020

(51) Int. Cl.
  *B60R 3/02* (2006.01)
  *B62D 33/027* (2006.01)

(52) U.S. Cl.
  CPC ............ *B60R 3/02* (2013.01); *B62D 33/0273* (2013.01)

(58) Field of Classification Search
  CPC .............................. B60R 3/02; B62D 33/0273
  See application file for complete search history.

(56) References Cited

U.S. PATENT DOCUMENTS

| | | | |
|---|---|---|---|
| 6,764,123 B1* | 7/2004 | Bilyard | B62D 33/0273 296/61 |
| 6,918,624 B2 | 7/2005 | Miller | |
| 8,444,201 B1 | 5/2013 | Crawford | |
| 8,505,944 B2 | 8/2013 | Genest | |
| 8,511,734 B2* | 8/2013 | Hutchins, Jr. | B60P 1/435 296/61 |
| 9,522,621 B2 | 12/2016 | Krajenke | |
| 9,902,328 B1 | 2/2018 | Mazur | |
| 2002/0070577 A1 | 6/2002 | Pool | |
| 2018/0043831 A1 | 10/2018 | Stojkovic | |

FOREIGN PATENT DOCUMENTS

CA          2972519          1/2019

* cited by examiner

*Primary Examiner* — D Glenn Dayoan
*Assistant Examiner* — Melissa Ann Bonifazi
(74) *Attorney, Agent, or Firm* — Kyle A. Fletcher, Esq.

(57) ABSTRACT

The deployable steps for a tailgate includes a mounting plate, a plurality of risers, a plurality of treads, and a plurality of hinges. The deployable steps for a tailgate may attach to a tailgate of a truck via the mounting plate. The plurality of risers and the plurality of treads may fold and unfold at the plurality of hinges. The plurality of risers and the plurality of treads may form steps when unfolded into a deployed position. When folded into a stowed position, the plurality of risers and the plurality of treads may be parallel to each other and may be parallel to the tailgate.

18 Claims, 5 Drawing Sheets

DEPLOYABLE STEPS FOR A TAILGATE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular accessories, more specifically, deployable steps for a tailgate.

SUMMARY OF INVENTION

The deployable steps for a tailgate comprises a mounting plate, a plurality of risers, a plurality of treads, and a plurality of hinges. The deployable steps for a tailgate may attach to a tailgate of a truck via the mounting plate. The plurality of risers and the plurality of treads may fold and unfold at the plurality of hinges. The plurality of risers and the plurality of treads may form steps when unfolded into a deployed position. When folded into a stowed position, the plurality of risers and the plurality of treads may be parallel to each other and may be parallel to the tailgate.

An object of the invention is to provide steps for entering and exiting the bed of a truck.

Another object of the invention is to provide steps that attach to the tailgate of the truck via a mounting plate.

A further object of the invention is to provide steps that fold into a stowed position where the plurality of risers and the plurality of treads are oriented parallel to each other, parallel to the mounting plate, and parallel to the tailgate.

Yet another object of the invention is to steps that unfold into a deployed position where they forms steps between the bed of the truck and the ground.

These together with additional objects, features and advantages of the deployable steps for a tailgate will be readily apparent to those of ordinary skill in the art upon reading the following detailed description of the presently preferred, but nonetheless illustrative, embodiments when taken in conjunction with the accompanying drawings.

In this respect, before explaining the current embodiments of the deployable steps for a tailgate in detail, it is to be understood that the deployable steps for a tailgate is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the deployable steps for a tailgate.

It is therefore important that the claims be regarded as including such equivalent construction insofar as they do not depart from the spirit and scope of the deployable steps for a tailgate. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
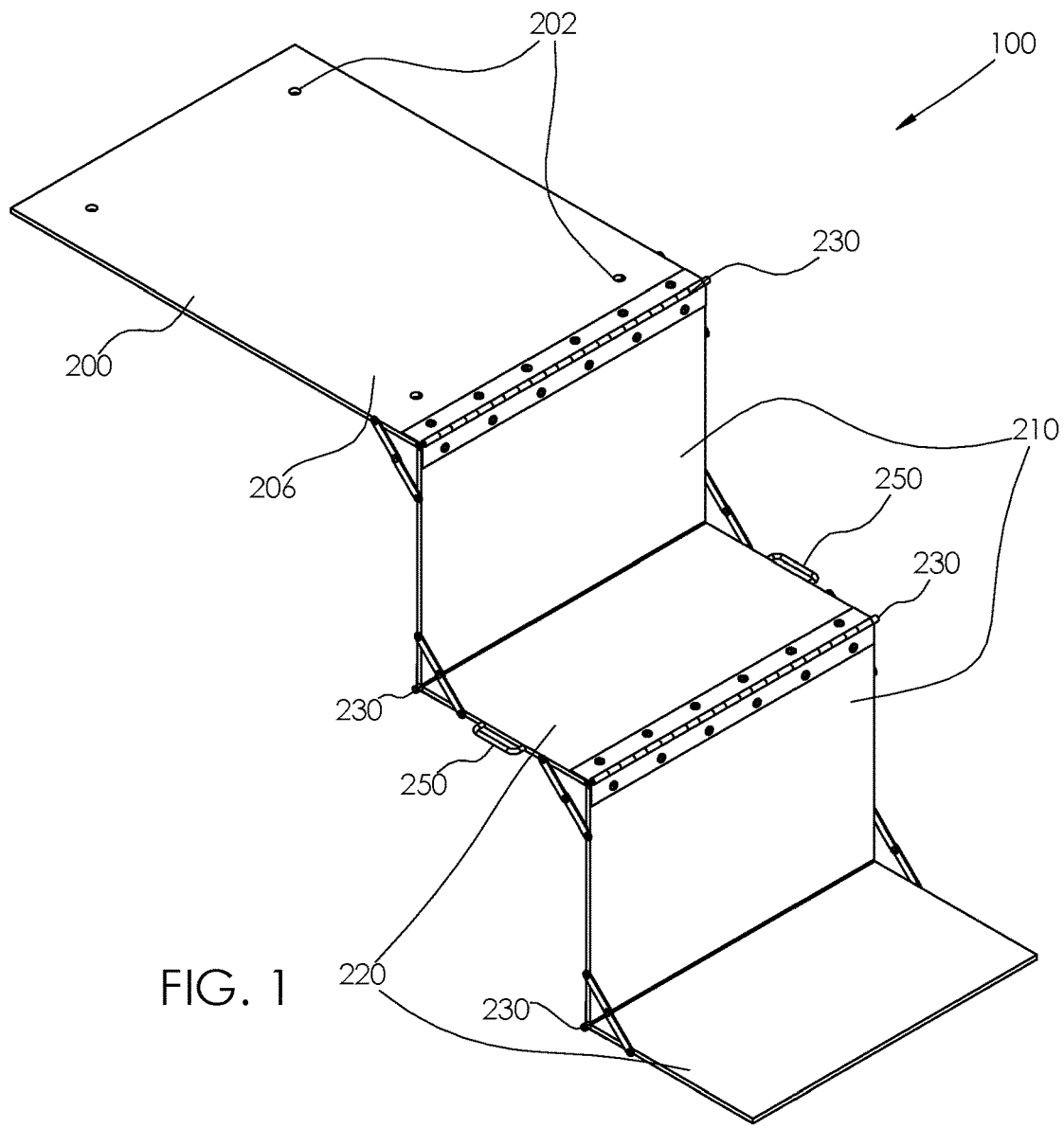
FIG. 1 is an isometric view of an embodiment of the disclosure illustrating the steps in the deployed position.
Figure 2:
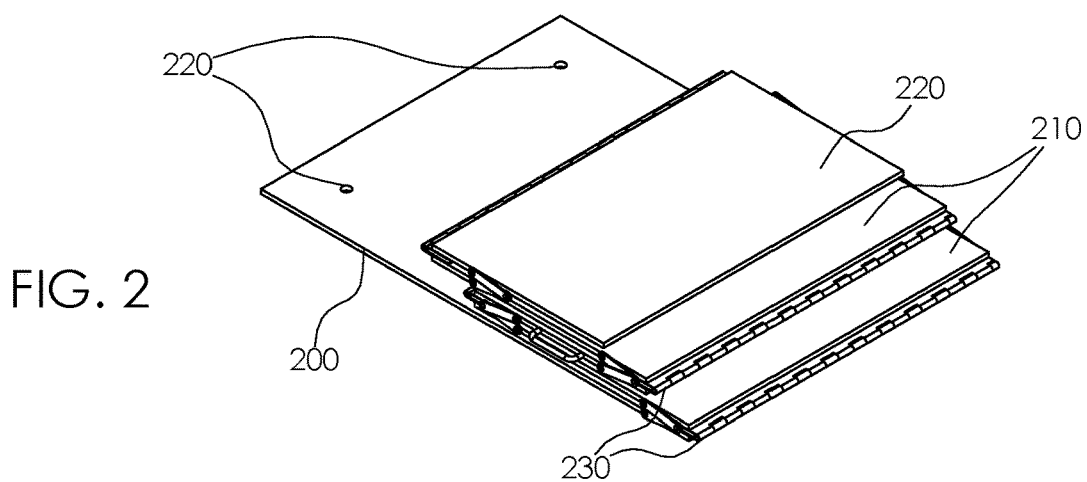
FIG. 2 is an isometric view of an embodiment of the disclosure illustrating the steps in the stowed position.
Figure 3:
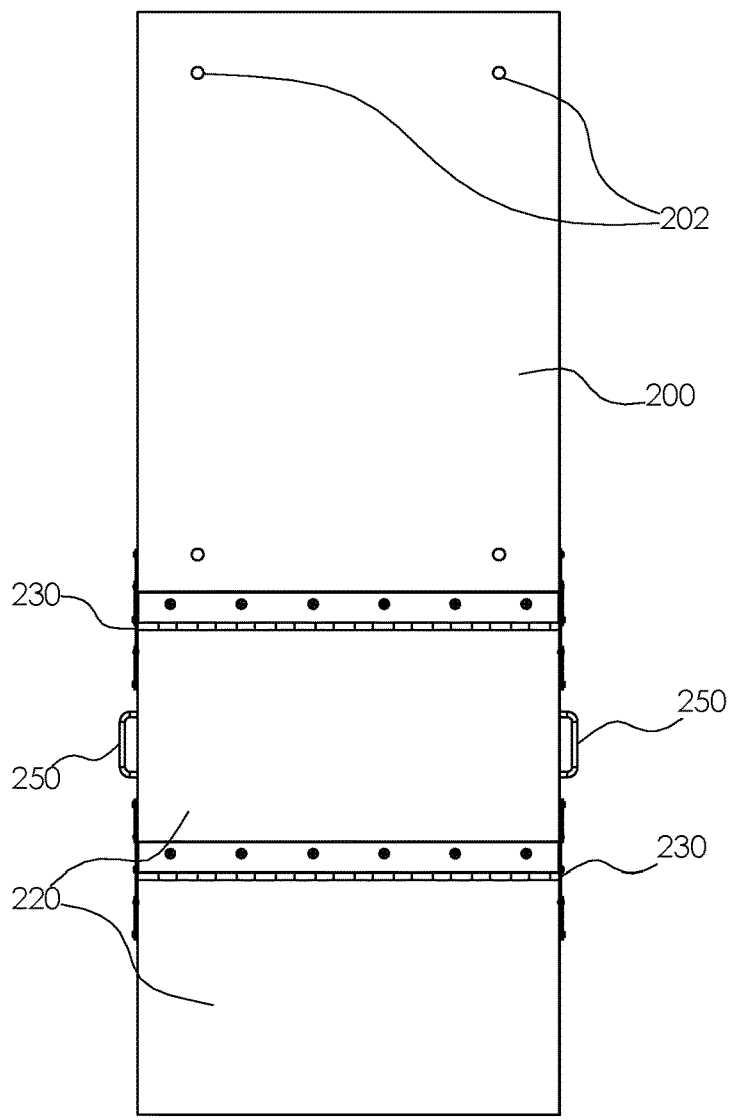
FIG. 3 is a top view of an embodiment of the disclosure illustrating the steps in the deployed position.
Figure 4:
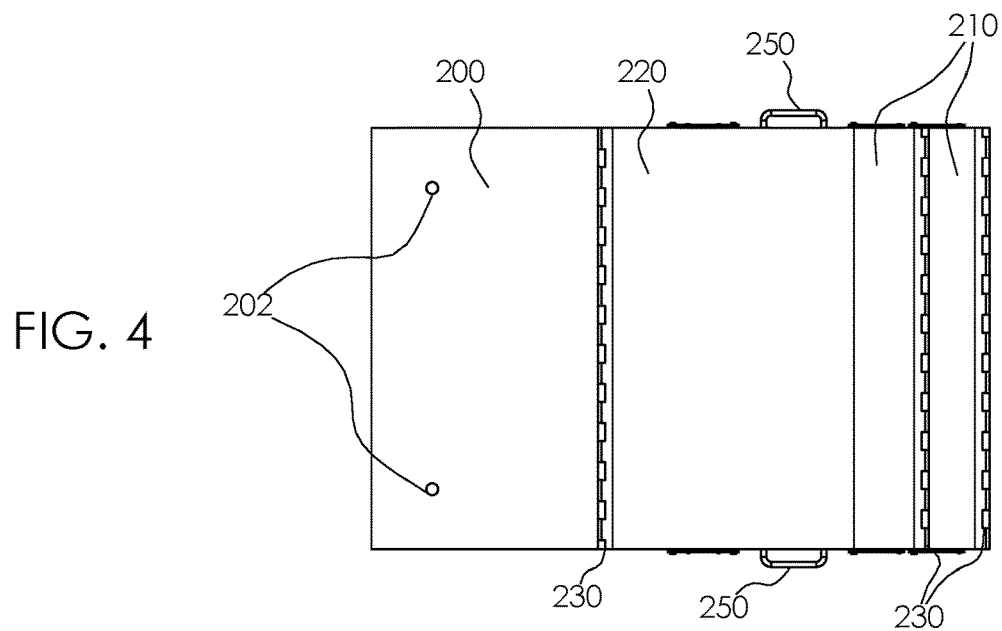
FIG. 4 is a top view of an embodiment of the disclosure illustrating the steps in the stowed position.
Figure 5:
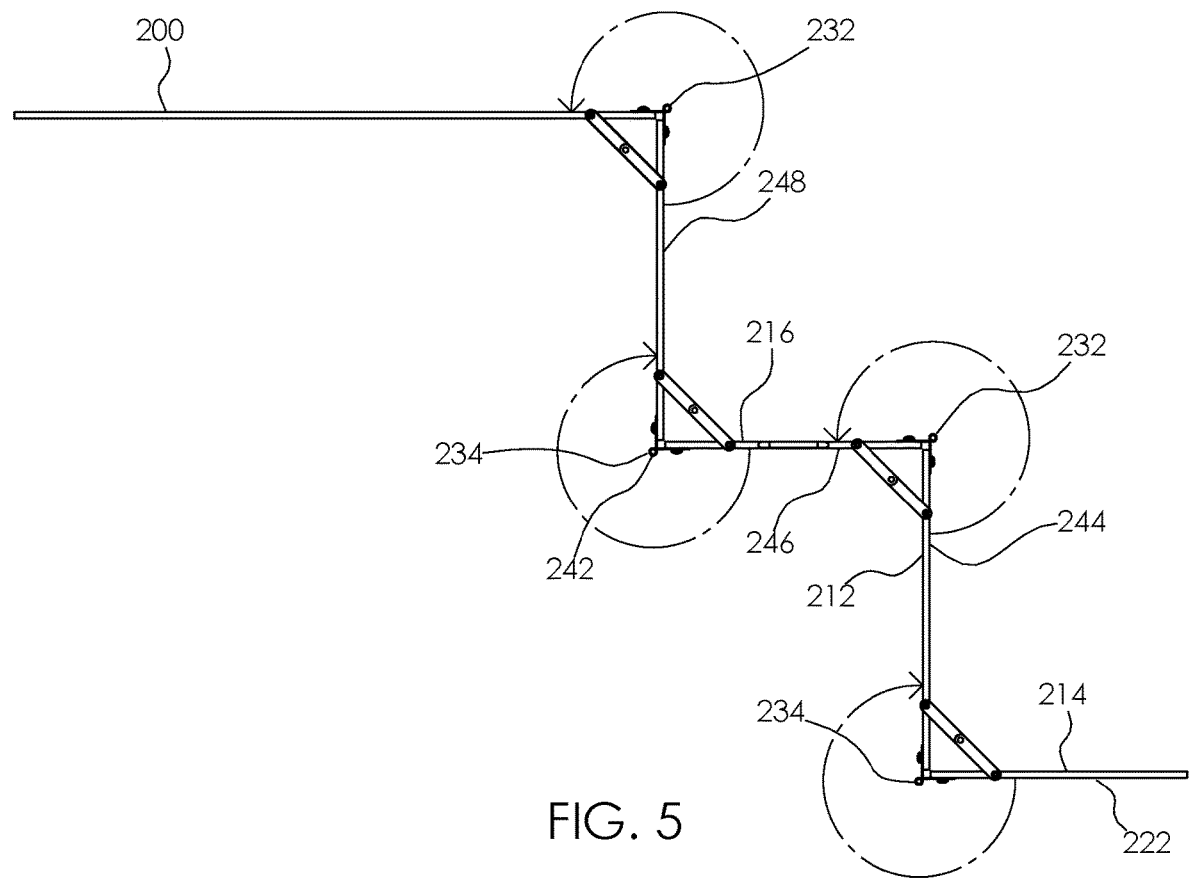
FIG. 5 is a side view of an embodiment of the disclosure illustrating the steps in the deployed position.
Figure 6:
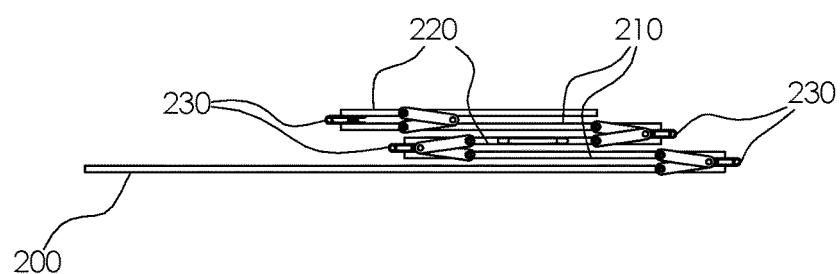
FIG. 6 is a side view of an embodiment of the disclosure illustrating the steps in the stowed position.
Figure 7:
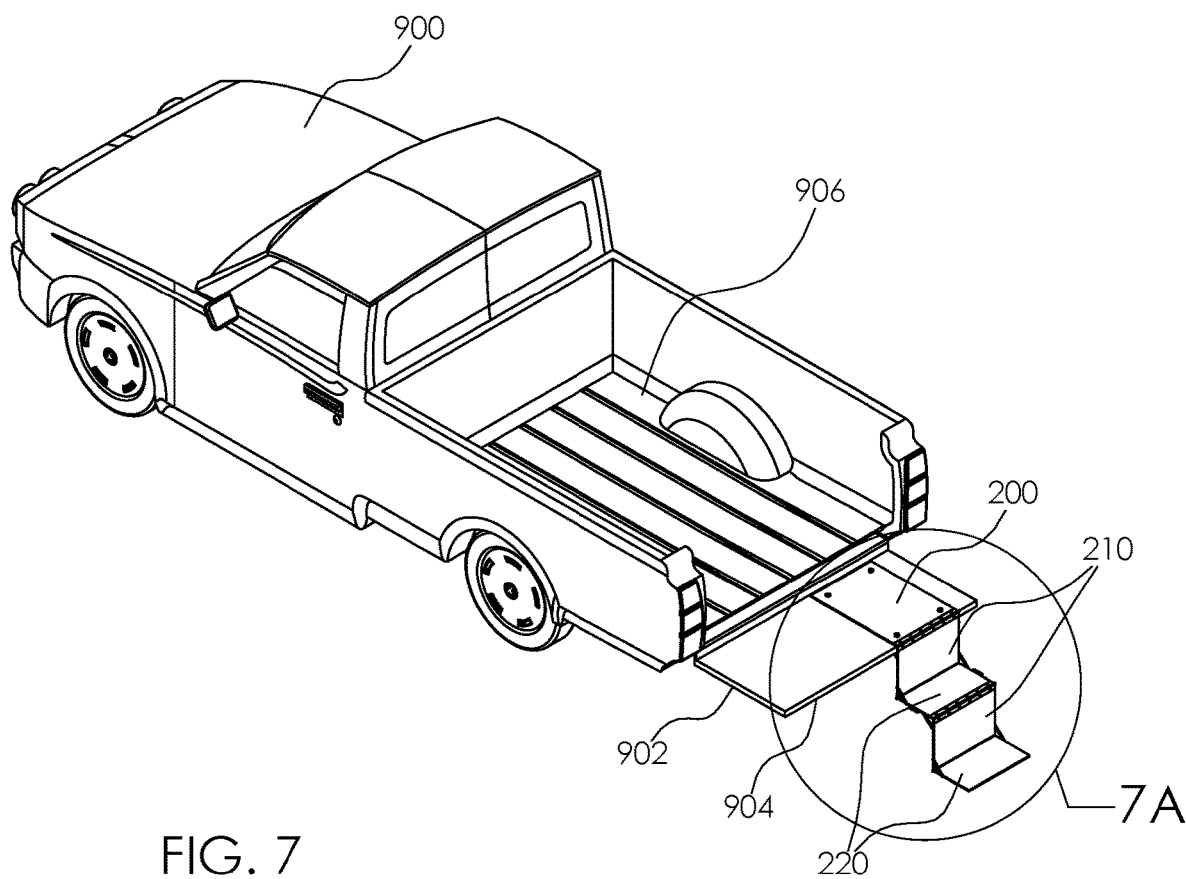
FIG. 7 is an in-use view of an embodiment of the disclosure illustrating the steps in the deployed position.
Figure 7A:
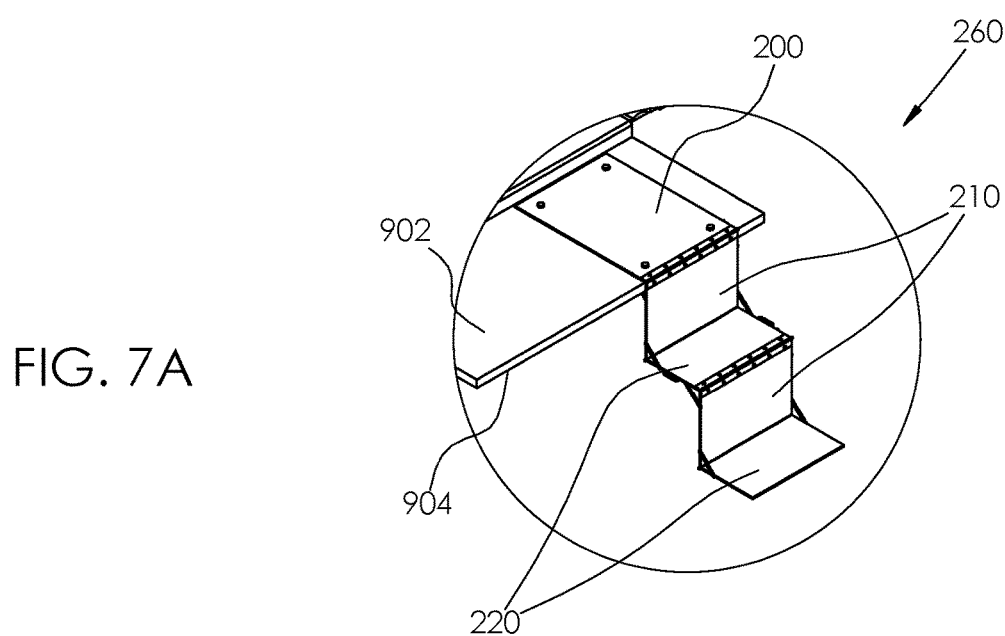
FIG. 7A is a detail view of the area designated 7A in FIG. 7.
Figure 8:
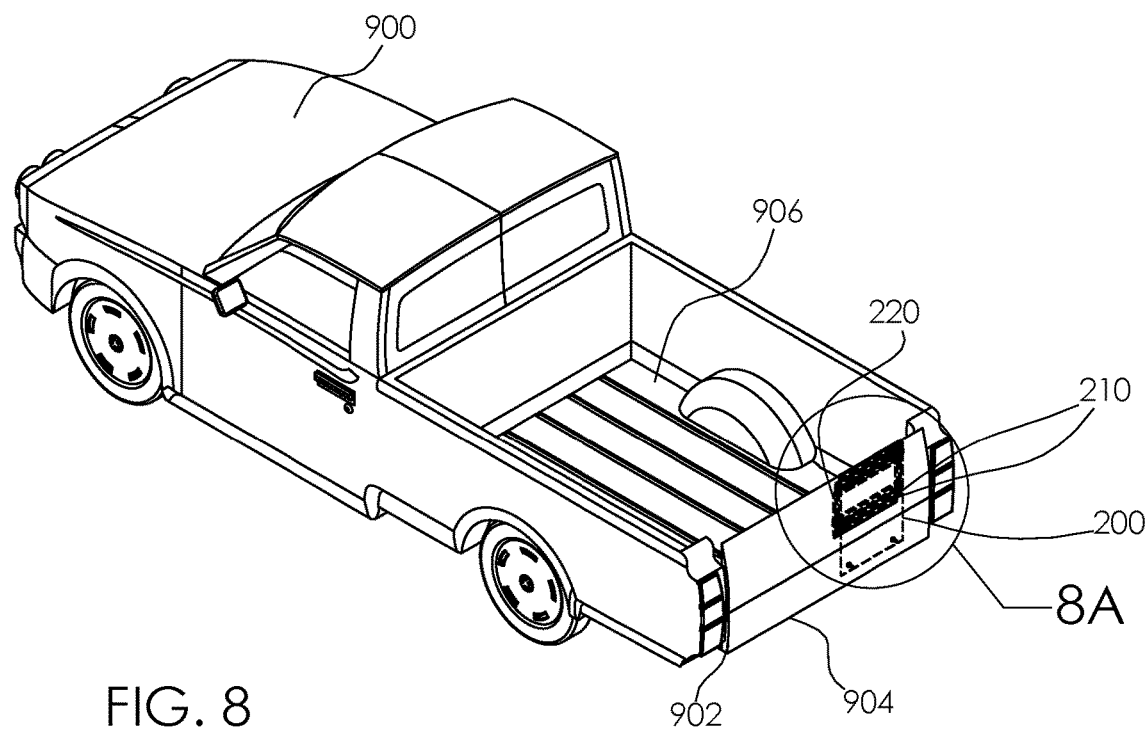
FIG. 8 is an in-use view of an embodiment of the disclosure illustrating the steps in the stowed position.
Figure 8A:
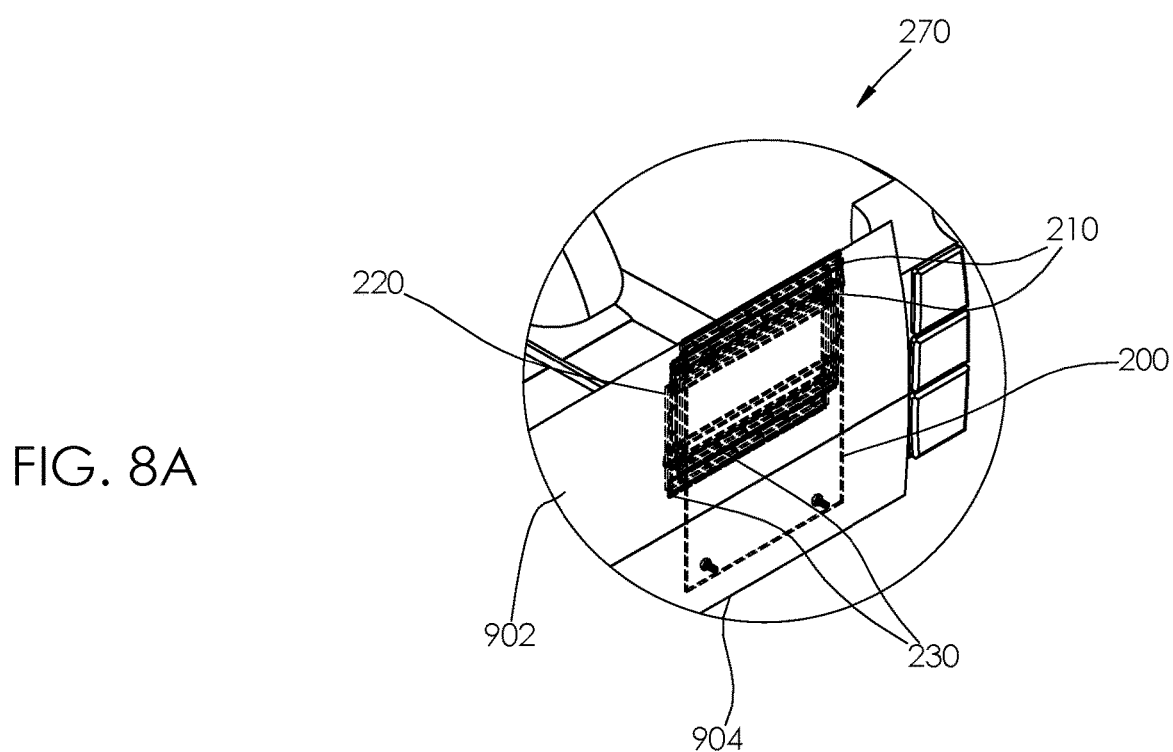
FIG. 8A is a detail view of the area designated 8A in FIG. 8.

Detailed reference will now be made to a first potential embodiment of the disclosure, which is illustrated in FIGS. 1 through 8A.

The deployable steps for a tailgate 100 (hereinafter invention) comprises a mounting plate 200, a plurality of risers 210, a plurality of treads 220, and a plurality of hinges 230. The invention 100 may attach to a tailgate 902 of a truck 900 via the mounting plate 200. The plurality of risers 210 and the plurality of treads 220 may fold and unfold at the plurality of hinges 230. The plurality of risers 210 and the plurality of treads 220 may form steps when unfolded into a deployed position 260. When folded into a stowed position 270, the plurality of risers 210 and the plurality of treads 220 may be parallel to each other and may be parallel to the tailgate 902.

The mounting plate 200 may be a flat plate that couples to the tailgate 902 of the truck 900. The mounting plate 200 may be positioned on the tailgate 902 such that a hinged side 206 of the mounting plate 200 is aligned with a top edge 904 of the tailgate 902. The mounting plate 200 may comprise a plurality of mounting apertures 202. The mounting plate 200 may be attached to the tailgate 902 via mounting hardware that passes through the plurality of mounting apertures 202 and couples to the tailgate 902.

The plurality of risers 210 may be plates that form the vertical elements of the steps. The plurality of risers 210 may define the vertical distance between the plurality of treads 220. The plurality of risers 210 may be adapted to prevent the steps from collapsing under the weight of a user by suspending a lower tread 214 from a higher tread 216. In some embodiments, an individual riser 212 selected from the plurality of risers 210 may be the same width as the hinged side 206 of the mounting plate 200.

The plurality of treads 220 may be plates that form the horizontal elements of the steps. The plurality of treads 220 may be adapted to for the user to stand upon while the user is climbing the steps. In some embodiments, an individual tread 222 selected from the plurality of treads 220 may be the same width as the individual riser 212. The plurality of treads 220 and the plurality of risers 210 may be of uniform width. In some embodiments, the front to back depth of the individual tread 222 may be different than the height of the individual riser 212.

The plurality of hinges 230 may pivotably join the mounting plate 200, the plurality of risers 210, and the plurality of treads 220. An individual hinge 242 selected from the plurality of hinges 230 may permit pivoting of two hinged components through an angle of 270 degrees. The individual tread 222 may pivot down and back to a position behind a riser above 244. The individual riser 212 may pivot forward and up to a position on top of a tread above 246. A top riser 248 may pivot onto the top of the mounting plate 200.

The plurality of hinges 230 may comprise a plurality of first hinges 232 and a plurality of second hinges 234. The plurality of first hinges 232 may permit the plurality of risers 210 to hinge up to a position on top the plurality of treads 220. The plurality of second hinges 234 may permit the plurality of treads 220 to pivot back to a position behind the plurality of risers 210. When pivoted to the stowed position 270, the mounting plate 200, the plurality of risers 210, and the plurality of treads 220 may stack parallel to each other on top of the tailgate 902. When pivoted to the deployed position 260, the plurality of hinges 230 may prevent the plurality of treads 220 from pivoting upwards and the plurality of risers 210 from pivoting rearwards.

One or more handles 250 may be coupled to the steps. The one or more handles 250 may be grasping points for use while pivoting the steps between the stowed position 270 and the deployed position 260. As a non-limiting example, two handles may be coupled to opposing sides of one of the individual tread 222 located at a midpoint of the steps.

In use, the mounting plate 200 may be attached to the tailgate 902 of the truck 900 via the plurality of mounting apertures 202 using the mounting hardware. In the stowed position 270, the plurality of risers 210 and the plurality of treads 220 may be stacked parallel to the mounting plate 200 against the tailgate 902. When the user desires to climb into a bed 906 of the truck 900, the tailgate 902 may be lowered to a horizontal orientation and the steps may be unfolded by pivoting the plurality of risers 210 and the plurality of treads 220 at the plurality of hinges 230 until the plurality of risers 210 and the plurality of treads 220 reach the ground. In the deployed position 260, each of the plurality of risers 210 may extend straight down from the tread above 246 and each of the plurality of treads 220 may extend rearward from the riser above 244. When no longer needed, the steps may be folded again by pivoting the plurality of risers 210 and the plurality of treads 220 at the plurality of hinges 230 until the plurality of risers 210 and the plurality of treads 220 at stacked on the tailgate 902. The tailgate 902 may then be raised to a vertical orientation. The one or more handles 250 may be used to move the steps between the stowed position 270 and the deployed position 260.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used herein, the words "couple", "couples", "coupled" or "coupling", refer to connecting, either directly or indirectly, and does not necessarily imply a mechanical connection.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "hinge" is a device that permits the turning, rotating, or pivoting of a first object relative to a second object.

As used in this disclosure, "horizontal" is a directional term that refers to a direction that is perpendicular to the local force of gravity. Unless specifically noted in this disclosure, the horizontal direction is always perpendicular to the vertical direction.

As used here, the word "midpoint" refers to a point that is between the ends of an object. An "exact midpoint" refers to a midpoint that is equidistant from edges of the object in at least one direction. Unless otherwise stated, a midpoint is not required to be at the exact center of the object but instead may be within 50% of the distance from the exact midpoint to the farthest edge or farthest corner.

As used herein, "mounting hardware" refers to mechanical devices that are used to attach one object to another, including devices whose only purpose is to improve aesthetics. As non-limiting examples, mounting hardware may include screws, nuts, bolts, washers, rivets, crossbars, hooks, collars, nipples, standoffs, knobs, caps, plates, rails, and brackets.

As used in this disclosure, "orientation" refers to the positioning and/or angular alignment of a first object relative to a second object or relative to a reference position or reference direction.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "plate" is a flat, rigid object having at least one dimension that is of uniform thickness and is thinner than the other dimensions of the object. Plates often have a rectangular or disk like appearance. Plates may be made of any material, but are commonly made of metal.

As used in this disclosure, a "tailgate" is a hinged door mounted on the rear of a pickup truck that can be pivoted open and, in some embodiments, removed in order to facilitate loading of the pickup truck.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8A, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A deployable step for a tailgate comprising:
a mounting plate, a plurality of risers, a plurality of treads, and a plurality of hinges;
wherein the deployable steps for a tailgate attach to a tailgate of a truck via the mounting plate;
wherein the plurality of risers and the plurality of treads fold and unfold at the plurality of hinges;
wherein the plurality of risers and the plurality of treads form steps when unfolded into a deployed position;
wherein the plurality of risers and the plurality of treads are parallel to each other and are parallel to the tailgate when folded into a stowed position;
wherein the plurality of hinges pivotably join the mounting plate, the plurality of risers, and the plurality of treads;
wherein an individual hinge selected from the plurality of hinges permits pivoting of two hinged components through an angle of 270 degrees.

2. The deployable steps for a tailgate according to claim 1
wherein the mounting plate is a flat plate that couples to the tailgate of the truck;
wherein the mounting plate is positioned on the tailgate such that a hinged side of the mounting plate is aligned with a top edge of the tailgate.

3. The deployable steps for a tailgate according to claim 2
wherein the mounting plate comprises a plurality of mounting apertures;
wherein the mounting plate is attached to the tailgate via mounting hardware that passes through the plurality of mounting apertures and couples to the tailgate.

4. The deployable steps for a tailgate according to claim 3
wherein the plurality of risers are plates that form the vertical elements of the steps;
wherein the plurality of risers define the vertical distance between the plurality of treads;
wherein the plurality of risers are adapted to prevent the steps from collapsing under the weight of a user by suspending a lower tread from a higher tread.

5. The deployable steps for a tailgate according to claim 4
wherein an individual riser selected from the plurality of risers is the same width as the hinged side of the mounting plate.

6. The deployable steps for a tailgate according to claim 4
wherein the plurality of treads are plates that form the horizontal elements of the steps;
wherein the plurality of treads are adapted to for the user to stand upon while the user is climbing the steps.

7. The deployable steps for a tailgate according to claim 6
wherein an individual tread selected from the plurality of treads is the same width as the individual riser.

8. The deployable steps for a tailgate according to claim 6
wherein the plurality of treads and the plurality of risers are of uniform width.

9. The deployable steps for a tailgate according to claim 6
wherein the front to back depth of the individual tread is different than the height of the individual riser.

10. The deployable steps for a tailgate according to claim 6
wherein the individual tread pivots down and back to a position behind a riser above.

11. The deployable steps for a tailgate according to claim 10
wherein the individual riser pivots forward and up to a position on top of a tread above.

12. The deployable steps for a tailgate according to claim 11
wherein a top riser pivots onto the top of the mounting plate.

13. The deployable steps for a tailgate according to claim 12
wherein the plurality of hinges comprises a plurality of first hinges and a plurality of second hinges;
wherein the plurality of first hinges permit the plurality of risers to hinge up to a position on top the plurality of treads.

14. The deployable steps for a tailgate according to claim 13
wherein the plurality of second hinges permit the plurality of treads to pivot back to a position behind the plurality of risers.

15. The deployable steps for a tailgate according to claim 14
wherein the mounting plate, the plurality of risers, and the plurality of treads stack parallel to each other on top of the tailgate when pivoted to the stowed position.

16. The deployable steps for a tailgate according to claim 15
wherein the plurality of hinges prevent the plurality of treads from pivoting upwards when pivoted to the deployed position;

wherein the plurality of hinges prevent the plurality of risers from pivoting rearwards when pivoted to the deployed position.

17. The deployable steps for a tailgate according to claim 16
wherein one or more handles are coupled to the steps;
wherein the one or more handles are grasping points for use while pivoting the steps between the stowed position and the deployed position.

18. The deployable steps for a tailgate according to claim 17 wherein two handles are coupled to opposing sides of one of the individual treads located at a midpoint of the steps.

\* \* \* \* \*